United States Patent
Wakabayashi et al.

(10) Patent No.: US 9,782,864 B2
(45) Date of Patent: Oct. 10, 2017

(54) AUTOMATIC GREASING DEVICE FOR CHUCK IN CRANKSHAFT MILLER

(71) Applicant: KOMATSU NTC LTD., Nanto-shi, Toyama (JP)

(72) Inventors: Nobuyuki Wakabayashi, Ishikawa (JP); Masumi Shimomura, Ishikawa (JP)

(73) Assignee: KOMATSU NTC LTD., Nanto-Shi, Toyama (JP)

( * ) Notice: Subject to any disclaimer, the term of this patent is extended or adjusted under 35 U.S.C. 154(b) by 128 days.

(21) Appl. No.: 14/422,925

(22) PCT Filed: Jun. 21, 2013

(86) PCT No.: PCT/JP2013/067084
§ 371 (c)(1),
(2) Date: Feb. 20, 2015

(87) PCT Pub. No.: WO2014/030422
PCT Pub. Date: Feb. 27, 2014

(65) Prior Publication Data
US 2015/0224618 A1    Aug. 13, 2015

(30) Foreign Application Priority Data

Aug. 21, 2012    (JP) ................................. 2012-182194

(51) Int. Cl.
*B23Q 11/12* (2006.01)
*B23C 3/06* (2006.01)
(Continued)

(52) U.S. Cl.
CPC ............ *B23Q 11/122* (2013.01); *B23B 31/16* (2013.01); *B23B 31/16258* (2013.01);
(Continued)

(58) Field of Classification Search
CPC .... B23Q 11/122; B23Q 17/0995; B23B 31/16; F16N 29/02; B23C 3/06; B23C 2215/20; B23C 2250/12; B23C 2270/28
See application file for complete search history.

(56) References Cited

U.S. PATENT DOCUMENTS

| 4,550,375 A | * | 10/1985 | Sato | ........................ | B23Q 41/00 |
| | | | | | 318/569 |
| 5,182,720 A | * | 1/1993 | Beck | ........................ | F16N 29/02 |
| | | | | | 184/108 |

(Continued)

FOREIGN PATENT DOCUMENTS

| JP | 11048008 A | 2/1999 |
| JP | 2003094262 A | 4/2003 |

(Continued)

OTHER PUBLICATIONS

International Search Report (ISR) dated Aug. 27, 2013 issued in International Application No. PCT/JP2013/067084.

(Continued)

*Primary Examiner* — William E Dondero
*Assistant Examiner* — Mark K Buse
(74) *Attorney, Agent, or Firm* — Holtz, Holtz & Volek PC

(57) ABSTRACT

To provide an automatic chuck greasing device in a crankshaft miller capable of ensuring chuck greasing without missing its timing and preventing failure to remove excess grease by wiping. In a crankshaft miller (1) which cuts, using a rotary cutter (7), a workpiece (2) held by a chuck (3), the automatic greasing device includes: a grease supply device (25) for supplying grease to sliding parts inside a chuck (3) including one between a chuck body (3*a*) and a chuck jaw (3*b*) in response to a greasing command signal outputted by a greasing command signal output unit (35) which has received a rotary cutter replacement command signal as a trigger signal from a rotary cutter replacement (Continued)

command signal output unit (33); and a notification means (30a, 30b) for notifying that a cutter (7) needs replacement in response to a notification command signal outputted by a notification command signal output unit (36) which has received the rotary cutter replacement command signal as the trigger signal from a rotary cutter replacement command signal output unit (33).

1 Claim, 5 Drawing Sheets

(51) Int. Cl.
*B23Q 17/09* (2006.01)
*F16N 29/02* (2006.01)
*B23B 31/16* (2006.01)
*B23B 31/177* (2006.01)
*B23Q 17/00* (2006.01)

(52) U.S. Cl.
CPC ...... *B23B 31/16262* (2013.01); *B23Q 17/008* (2013.01); *B23Q 17/0995* (2013.01); *F16N 29/02* (2013.01); *B23B 2215/20* (2013.01); *B23B 2231/24* (2013.01); *B23B 2270/28* (2013.01); *B23C 3/06* (2013.01); *B23C 2215/20* (2013.01); *B23C 2250/12* (2013.01); *Y10T 409/304032* (2015.01)

(56) References Cited

U.S. PATENT DOCUMENTS

| | | | | |
|---|---|---|---|---|
| 5,251,144 A * | 10/1993 | Ramamurthi | ...... | G05B 19/4065 700/177 |
| 5,647,705 A * | 7/1997 | Shimomura | ...... | B23C 3/06 409/132 |
| 5,878,842 A * | 3/1999 | Rake | ...... | F16N 29/02 184/108 |
| 6,216,822 B1 * | 4/2001 | May | ...... | F16N 11/08 184/105.1 |
| 7,017,712 B1 * | 3/2006 | Rake | ...... | F16N 29/02 184/108 |
| 7,059,450 B2 * | 6/2006 | O'Toole | ...... | F16N 7/385 184/105.1 |
| 8,204,629 B2 * | 6/2012 | Guenther | ...... | G05B 19/106 184/26 |
| 8,844,679 B2 * | 9/2014 | Conley | ...... | F16N 7/14 184/6.28 |
| 8,910,751 B2 * | 12/2014 | Williams, Jr. | ...... | F16N 7/22 184/6.1 |
| 2005/0133305 A1 | 6/2005 | Okada et al. | | |
| 2007/0075506 A1 * | 4/2007 | Gross | ...... | B23B 31/14 279/121 |
| 2010/0043409 A1 * | 2/2010 | Naydenov | ...... | F02D 41/3082 60/287 |
| 2013/0277148 A1 * | 10/2013 | Beck | ...... | F16N 29/02 184/6.4 |
| 2015/0345701 A1 * | 12/2015 | Conley | ...... | F16N 7/14 184/6.4 |

FOREIGN PATENT DOCUMENTS

| | | |
|---|---|---|
| JP | 2004130451 A | 4/2004 |
| JP | 2005177914 A | 7/2005 |
| JP | 2010110872 A | 5/2010 |

OTHER PUBLICATIONS

International Preliminary Report on Patentability (IPRP) including Written Opinion (and English translation thereof) dated Mar. 5, 2015, issued in parent International Application No. PCT/JP2013/067084.

* cited by examiner

AUTOMATIC GREASING DEVICE FOR CHUCK IN CRANKSHAFT MILLER

TECHNICAL FIELD

The present invention relates to an automatic greasing device for a chuck that is suitable for use in a crankshaft miller which cuts a crankshaft (workpiece) used, for example, in an engine.

BACKGROUND ART

In general, a crankshaft miller is equipped with a chuck which holds an end portion of a workpiece and positions it with high accuracy under a machining load.

This chuck is constructed of a chuck body coupled to a work head, a plurality of chuck jaws radially and slidably inserted into the chuck body, and clamp operating rods corresponding to the respective chuck jaws (refer to, for example, Patent Document 1).

RELATED ART DOCUMENT

Patent Document

Patent Document 1: Japanese Patent Unexamined Publication No. H11-048008

Inside the above-described chuck, a grease supply passage is formed for supplying grease to a sliding part between the chuck body and the chuck jaw, a sliding part between the chuck body and the clamp operating rod and others, and a grease nipple is mounted to an inlet opening of the grease supply passage.

Lubrication of each of the sliding parts and prevention of dust from entering the sliding parts are carried out by manually refilling with the grease from the grease nipple by means of a grease gun. Excess grease overflowed from the chuck as a result of the manual greasing is wiped off manually by a worker.

The above-mentioned greasing work is done by the worker on a regular basis. However, the worker sometimes forgets to do this greasing work.

Accordingly, mounting a device for automatically supplying the grease to the sliding parts of the chuck is conceivable.

However, a conventional automatic greasing device is configured simply for supplying a specified amount of grease to the sliding parts of the chuck at predetermined intervals of time. Because of this, even when an exterior surface of the chuck is stained with the excess grease overflowed from the chuck, the stained surface is left as it is for a long time, thus causing chips to adhere to and accumulate on the grease-stained exterior surface of the chuck. This may problematically cause a decrease in workpiece clamping accuracy and malfunction of the chuck jaws.

SUMMARY OF THE INVENTION

Problems to be Solved by the Invention

In view of the problems mentioned above, the present invention aims to provide an automatic greasing device for a chuck in a crankshaft miller that can ensure greasing of the chuck without missing the timing to grease and prevent failure to wipe excess grease.

Means for Solving the Problems

To achieve the above object, an automatic greasing device for a chuck according to the present invention is an automatic chuck greasing device in a crankshaft miller, which includes the chuck including a plurality of chuck jaws radially and slidably inserted into a chuck body and cuts a workpiece clamped by the chuck jaws by means of a rotary cutter, the automatic greasing device including:

a rotary cutter life determination unit for determining a life of the rotary cutter;

a rotary cutter replacement command signal output unit for outputting a rotary cutter replacement command signal based on a rotary cutter life determination datum from the rotary cutter life determination unit;

a greasing command signal output unit for outputting a greasing command signal in response to the rotary cutter replacement command signal acting as a trigger signal from the rotary cutter replacement command signal output unit;

a grease supply device for supplying grease to a sliding part inside the chuck in response to the greasing command signal from the greasing command signal output unit, the sliding parts including a sliding part between the chuck body and each of the chuck jaws;

a notification command signal output unit for outputting a notification command signal in response to the rotary cutter replacement command signal acting as the trigger signal from the rotary cutter replacement command signal output unit; and notification means for notifying that the rotary cutter needs replacement in response to the notification command signal from the notification command signal output unit (First invention).

In the present invention, it is preferable that the automatic greasing device for the chuck in the crankshaft miller further includes:

a chuck cleaning command signal output unit for outputting a chuck cleaning command signal in response to the greasing command signal acting as a trigger signal from the greasing command signal output unit; and display means for displaying a description urging cleaning of the chuck in response to the chuck cleaning command signal from the chuck cleaning command signal output unit (Second invention).

Advantages of the Invention

In the present invention, the rotary cutter replacement command signal output unit outputs the rotary cutter replacement command signal when the rotary cutter reaches the end of its life. In response to this rotary cutter replacement command signal acting as the trigger signal, the greasing command signal output unit and the notification command signal output unit output the greasing command signal and the notification command signal, respectively. In response to the greasing command signal, the grease supply device supplies the grease to the sliding parts inside the chuck that include the sliding part between the chuck body and each of the chuck jaws. And in response to the notification command signal, the notification means notifies that the rotary cutter needs to be replaced.

According to the invention, the grease is automatically supplied to the chuck at the time of the replacement of the rotary cutter, and excess grease which overflowed as a result of the greasing can be wiped off in conjunction with the replacement of the rotary cutter. In this way, the greasing of the chuck can be ensured without missing its timing, and failure to remove the excess grease by wiping can be prevented.

Adopting the structure of the Second invention can further ensure the prevention of the failure to remove the excess grease overflowed from the chuck.

DETAILED DESCRIPTION OF PREFERRED EMBODIMENT

A concrete exemplary embodiment of an automatic greasing device for a chuck in a crankshaft miller according to the present invention is demonstrated hereinafter with reference to the accompanying drawings.

(Brief Description of the Structure of the Crankshaft Miller)

Figure 1:
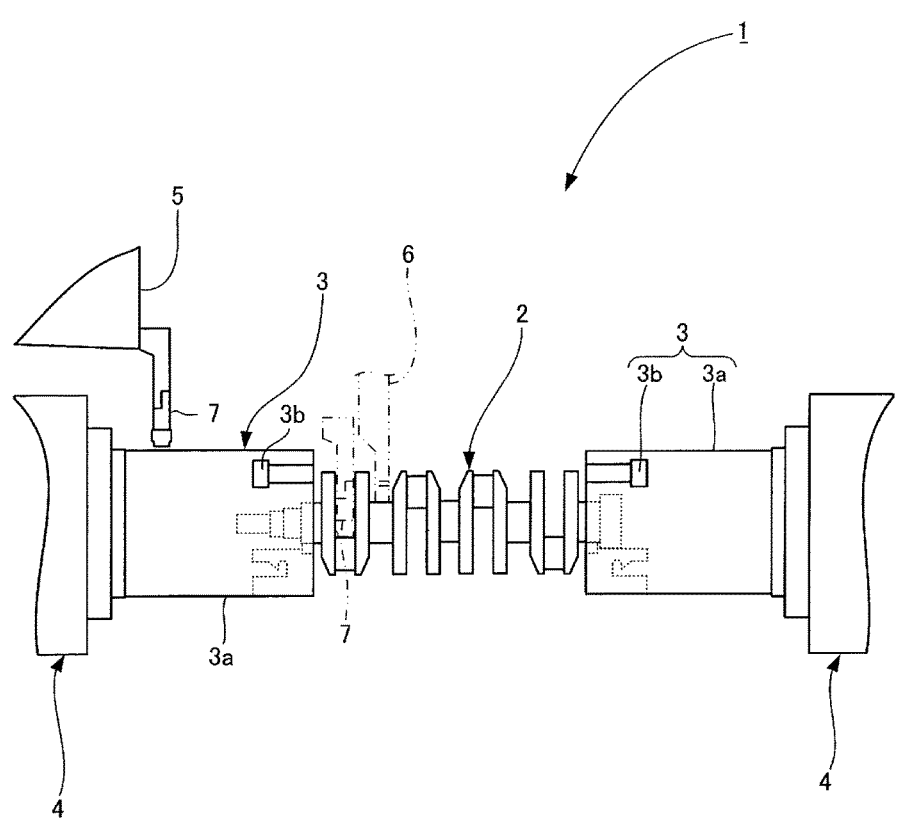
FIG. 1 is a structural illustration of an essential part of a crankshaft miller with a workpiece set between work heads in accordance with an exemplary embodiment of the present invention.

A crankshaft miller 1 shown in FIG. 1 is equipped with: two work heads 4, 4, installed on a bed (not shown) to face each other, for supporting respective ends of a workpiece 2 through respective chucks 3, 3; a cutter device 5, disposed between the work heads 4, 4, for cutting the workpiece 2; and a work rest device 6 for clamping the workpiece 2 so as to prevent the workpiece 2 from shaking during cutting. A rotary cutter 7 of an inner blade type is provided to the cutter device 5 to cut straight or along an arc into the workpiece 2 for plunge cutting or rotary cutting.

(Brief Description of the Structure of the Chuck)

Figure 2:
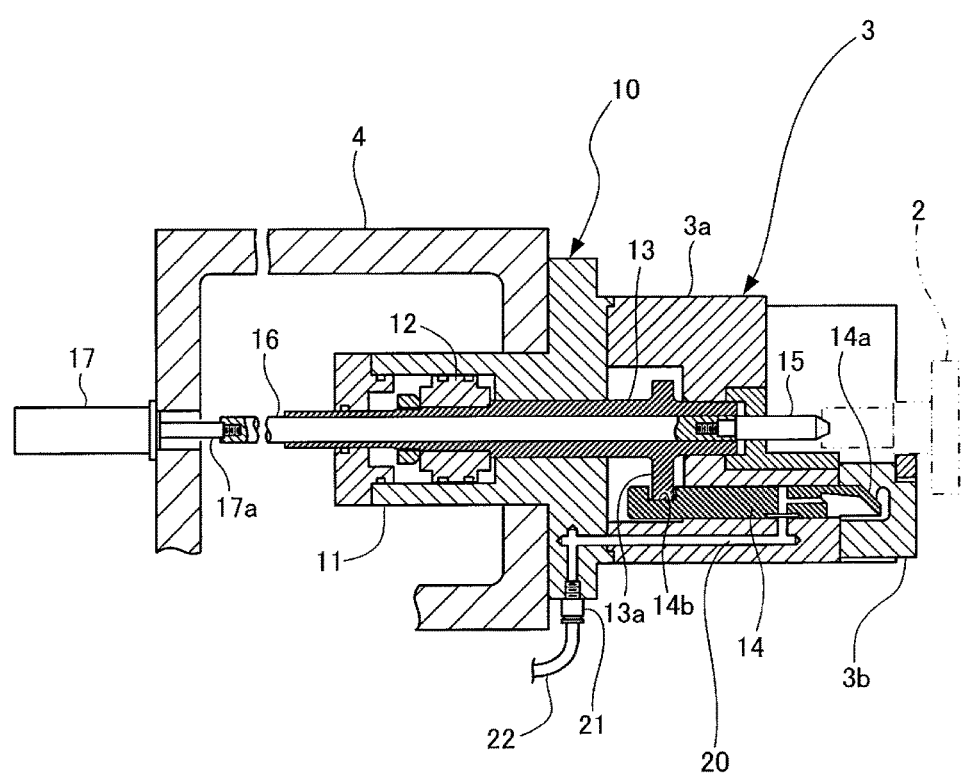
FIG. 2 is a longitudinal sectional view of a chuck coupled to the work head.
Figure 3:
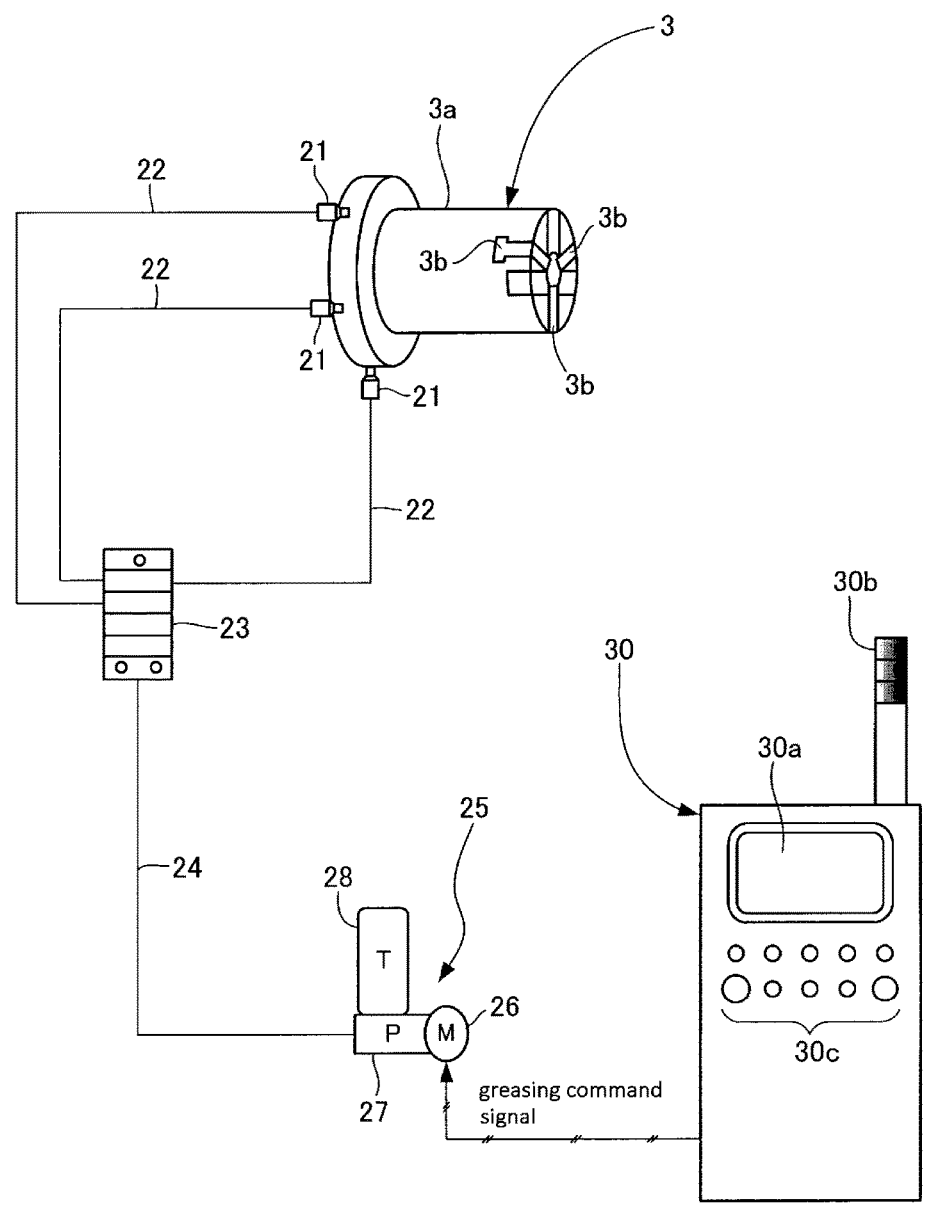
FIG. 3 schematically shows a system configuration of an automatic greasing device for the chuck.

As shown in FIG. 2, each chuck 3 has a chuck body 3a fixed to the work head 4 through a clamp cylinder device 10, and three chuck jaws 3b are inserted into this chuck body 3a in a radial and circumferentially evenly spaced pattern to be radially slidable (refer to FIG. 3).

The clamp cylinder device 10 is constructed by inserting into a clamp cylinder body 11 a hollow piston 12 and a hollow piston rod 13 connected concentrically with the piston 12.

Piston rod 13 is provided with, at its leading end, a flange 13a projecting radially outward.

Clamp operating rods 14 are inserted in the chuck body 3a to correspond to the chuck jaws 3b, respectively. Each clamp operating rod 14 is formed with, at its leading end, an inclined face 14a which abuts against the chuck jaw 3b and, at its base end, a recess 14b for locking the flange 13a of the piston rod 13.

Inside the chuck 3, the action of pressure oil being fed into the clamp cylinder body 11 causes pushing of the clamp operating rods 14 toward the workpiece 2 through the piston rod 13, thereby moving the chuck jaws 3b radially inward to clamp the end of the workpiece 2.

The chuck body 3a is provided with, in its center position, a center 15 which supports the workpiece 2 in the center position of the chuck body 3a by being fitted into a center hole previously provided in an end face of the workpiece 2. This center 15 is attached to one end (which faces the workpiece 2) of a drive rod 16 which is provided to pass through the central part shared by the clamp cylinder body 11, the piston 12 and the piston rod 13.

The other end of the drive rod 16 is connected to a piston rod 17a of a center driving cylinder 17 fixed to the work head 4. The center driving cylinder 17 thus moves the center 15 toward and away from the workpiece 2 through the drive rod 16.

(Description of a Grease Supply Passage)

Inside the chuck body 3a, a grease supply passage 20 is formed for supplying grease to a sliding part between the chuck body 3a and the chuck jaw 3b, a sliding part between the chuck body 3a and the clamp operating rod 14 and others.

(Description of a Grease Supply Device)

As shown in FIGS. 2 and 3, an inlet opening of the grease supply passage 20 is coupled to a grease supply device 25 through a corresponding piping joint 21, a corresponding distribution hose 22, a distributor 23 and a main hose 24.

The grease supply device 25 includes a motor 26 which starts in response to a greasing command signal from a NC device 30, a grease pump 27 driven by the motor 26, and a grease tank 28 provided to an inlet port of the grease pump 27. As the grease pump 27 is driven, the grease is forced out of the grease tank 28 and exits from a discharge port of the grease pump 27.

(Description of the Flow of the Grease Supply)

The grease forced out and exiting from the discharge port of the grease pump 27 is introduced into the distributor 23 through the main hose 24. The grease introduced into the distributor 23 is distributed to the inlet openings of the respective grease supply passages 20 through the distribution hoses 22 and the piping joints 21. Passing through the grease supply passage 20, the grease is supplied to the sliding part between the chuck body 3a and the clamp operating rod 14, the sliding part between the chuck body 3a and the chuck jaw 3b and others.

(Description of Features of the NC Device)

In this embodiment, the greasing operation of the grease supply device 25 and its related operations are controlled by the NC device 30 which is responsible for sequence control and numerical control in the crankshaft miller 1. Here, the NC device 30 is formed of a central processing unit (CPU not shown), a memory (not shown), an image display 30a such as a liquid crystal display, an indicator lamp 30b, various switches 30c and others. As a given program stored in the memory is run by the CPU, various function parts shown in a functional block diagram of FIG. 4 are brought into effect.

Figure 4:
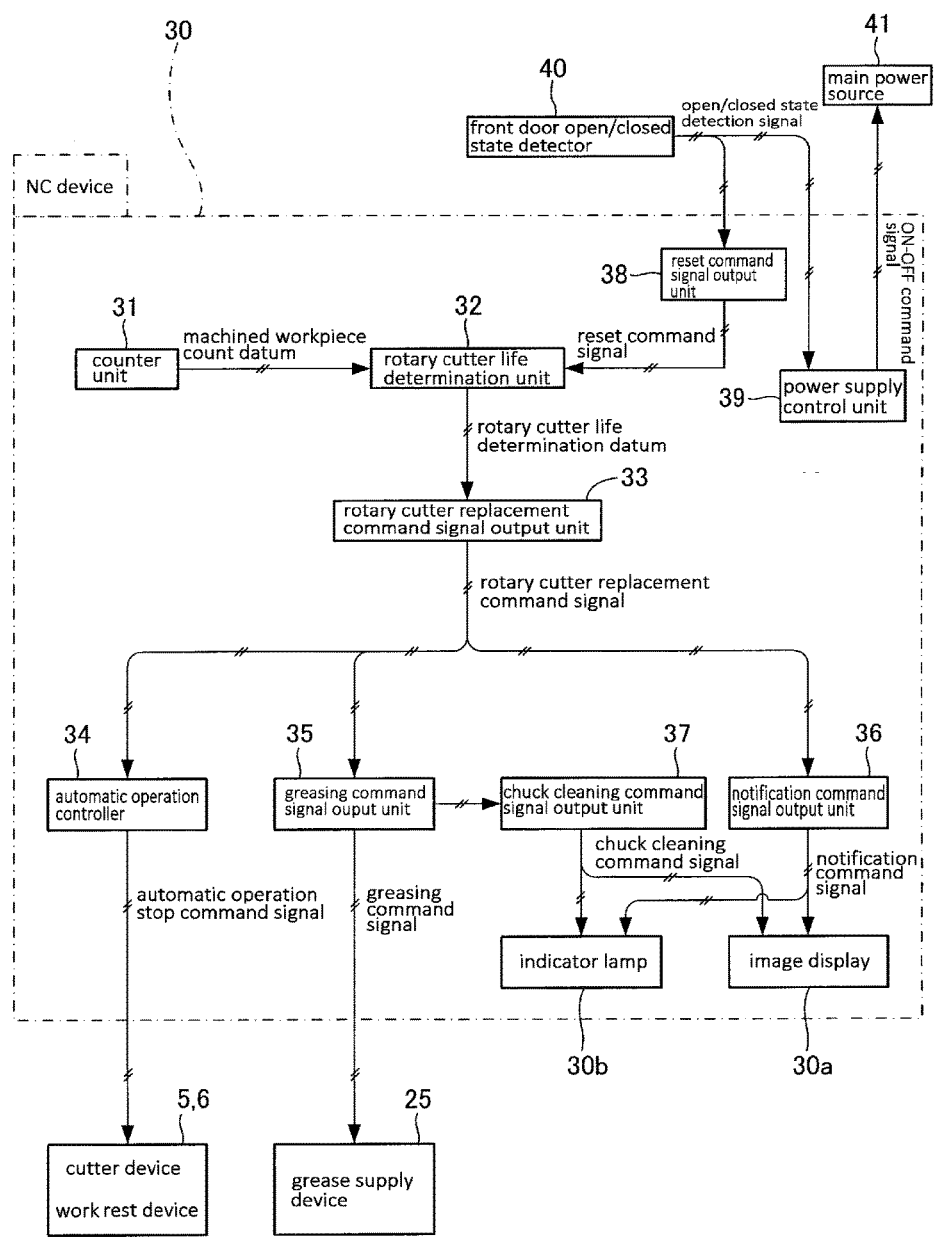
FIG. 4 is a functional block diagram of an NC device.

In the functional block diagram of the NC device 30 shown in FIG. 4, a counter unit 31 counts up the machined workpieces 2 and transmits a machined workpiece count datum to a rotary cutter life determination unit 32. It is to be noted that the counter unit 31 may count, instead of the machined workpieces 2, time or current values required for machining the workpieces 2.

Based on the machined workpiece count datum from the counter unit 31, when the number of the machined workpieces 2 reaches a predetermined number, the rotary cutter life determination unit 32 determines that the rotary cutter 7 has reached the end of its life and transmits a rotary cutter life determination datum to a rotary cutter replacement command signal output unit 33.

Based on the rotary cutter life determination datum from the rotary cutter life determination unit 32, the rotary cutter replacement command signal output unit 33 transmits a rotary cutter replacement command signal to an automatic operation controller 34, a greasing command signal output unit 35 and a notification command signal output unit 36 respectively.

In response to the rotary cutter replacement command signal acting as a trigger signal from the rotary cutter replacement command signal output unit 33, the automatic operation controller 34 transmits an automatic operation stop command signal to the cutter device 5, the work rest device 6 and others.

Similarly, the greasing command signal output unit 35 transmits a greasing command signal to the grease supply device 25 and a chuck cleaning command signal output unit 37, while the notification command signal output unit 36 transmits a notification command signal to the image display 30a and the indicator lamp 30b.

In response to the greasing command signal acting as a trigger signal from the greasing command signal output unit 35, the chuck cleaning command signal output unit 37 transmits a chuck cleaning command signal to, for example, the image display 30a and the indicator lamp 30b.

The NC device 30 is further provided with a reset command signal output unit 38 and a power supply control unit 39.

The reset command signal output unit 38 transmits a reset command signal to the rotary cutter life determination unit 32 based on an open/closed state detection signal from a front door open/closed state detector 40.

The power supply control unit 39 transmits a main power ON/OFF command signal to a main power source 41 based on the open/closed state detection signal from the front door open/closed state detector 40.

Here, the front door open/closed state detector 40 detects an open/closed state of a front door (not shown) which hides and unhides an opening corresponding to an area defined between the two work heads 4, 4 and is formed of, for example, a limit switch.

(Description of Processing Contents of the Automatic Chuck Greasing Program)

Figure 5:
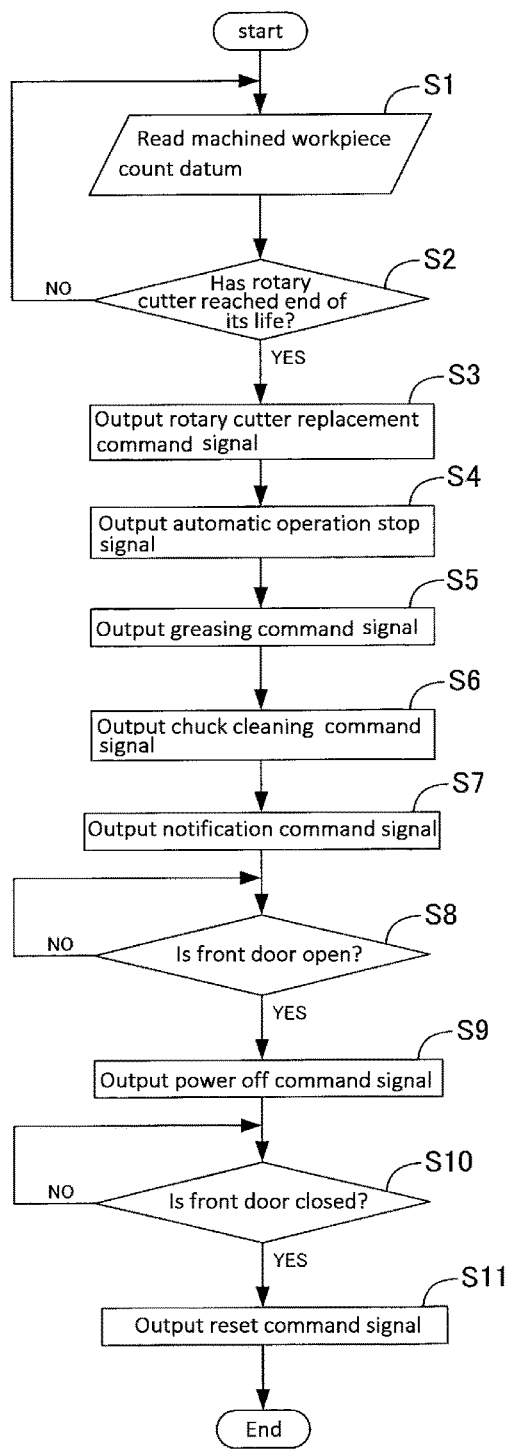
FIG. 5 is a flowchart explaining processing details of an automatic chuck greasing program.

A description is provided next of the processing contents of the automatic chuck greasing program which is run by the NC device 30 with reference to a flowchart of FIG. 5. It is to be noted that the flowchart shows an example in which the processing contents shown therein are carried out during automatic operation. Reference marks S in FIG. 5 denote steps.

(Description of the Processing Contents in steps S1 through S3)

First, the rotary cutter life determination unit 32 reads the machined workpiece count datum from the counter unit 31 (S1). Based on the machined workpiece count datum read, a determination is made as to whether the rotary cutter 7 has reached the end of its life (S2). If it is determined that the rotary cutter 7 has reached the end of its life (YES in S2), the rotary cutter life determination datum is transmitted to the rotary cutter replacement command signal output unit 33. Based on the rotary cutter life determination datum from the cutter life determination unit 32, the rotary cutter replacement command signal output unit 33 transmits the rotary cutter replacement command signal to the automatic operation controller 34, the greasing command signal output unit 35 and the notification command signal output unit 36 respectively (S3).

(Description of the Processing Contents in steps S4 and S5)

In response to the rotary cutter replacement command signal acting as the trigger signal from the rotary cutter replacement command signal output unit 33, the automatic operation controller 34 transmits the automatic operation stop command signal to the cutter device 5, the work rest device 6 and others (S4). As a result, the automatic operation is brought to a halt.

In response to the rotary cutter replacement command signal acting as the trigger signal from the rotary cutter replacement command signal output unit 33, the greasing command signal output unit 35 transmits the greasing command signal to the grease supply device 25 (S5). Thus, the grease is supplied from the grease supply device 25 through the main hose 24, the distributor 23, the distribution hoses 22, the piping joints 21 and the grease supply passages 20 to the sliding parts between the chuck body 3a and the clamp operating rods 14, the sliding parts between the chuck body 3a and the chuck jaws 3b and others.

(Description of the Processing Content in step S6)

Receiving the greasing command signal acting as the trigger signal from the greasing command signal output unit 35, the chuck cleaning command signal output unit 37 transmits the chuck cleaning command signal to, for example, the image display 30a and the indicator lamp 30b (S6). As a result, the indicator lamp 30b lights up to call a worker for cleaning of the chuck 3, and a description urging the cleaning of the chuck 3 is displayed on the image display 30a.

(Description of the Processing Content in step S7)

In response to the rotary cutter replacement command signal acting as the trigger signal from the rotary cutter replacement command signal output unit 33, the notification command signal output unit 36 transmits the notification command signal for notifying that the rotary cutter 7 needs replacement to the image display 30a and the indicator lamp 30b. As a result, a description notifying that the rotary cutter 7 needs to be replaced is displayed on the image display 30a, and the indicator lamp 30b lights up to call for the replacement of the rotary cutter 7.

(Description of the Processing Contents in steps S8 through S11)

When it is determined based on the open/closed state detection signal from the front door open/closed state detector 40 that the front door has been opened (YES in S8), the power supply control unit 39 transmits the power OFF command signal to the main power source 41 (S9), whereby main power to the crankshaft miller 1 is turned off.

When it is determined based on the open/closed state detection signal from the front door open/closed state detector 40 that the front door has been closed thereafter (YES in S10), the reset command signal output unit 38 transmits the reset command signal to the rotary cutter life determination unit 32 (S11), whereby the rotary cutter life determination datum is reset.

(Description of Effects)

In the present embodiment, when the rotary cutter 7 reaches the end of its life, the grease is automatically supplied from the grease supply device 25 to the sliding parts inside the chuck 3. Concurrently, the image display 30a displays the description notifying that the rotary cutter 7 needs replacement and the description urging cleaning of the chuck 3, while the indicator lamp 30b lights up for these indications. Because the grease is automatically supplied to the chuck 3 at the time of the replacement of the rotary cutter 7, while the request for the chuck cleaning is indicated by the image display 30a and the indicator lamp 30b, removal of excess grease which overflowed as a result of the greasing is carried out in conjunction with the rotary cutter replacement work. Thus, the greasing of the chuck 3 can be ensured without missing its timing, and failure to remove the excess grease by wiping can be reliably prevented.

The embodiment of the automatic greasing device for the chuck in the crankshaft miller according to the present invention has been described above. However, the present invention is not limited to the structure described in this embodiment and allows appropriate variations on the structure without departing from the spirit of the invention.

The above embodiment has given the example in which the chuck 3 is greased each time the rotary cutter 7 is replaced, that is to say, in which the greasing command signal is output from the greasing command signal output unit 35 each time the rotary cutter replacement command signal output unit 33 outputs the rotary cutter replacement command signal. However, the invention is not limited to this example, and the variation may be, for example, that the chuck 3 is greased on the occasion of the Nth replacement (where N is an arbitrary number greater than 1) of the rotary cutter 7, that is to say, that the greasing command signal is output from the greasing command signal output unit 35 on the occasion of the Nth output (where arbitrary N is an integer greater than 1) of the rotary cutter replacement command signal from the cutter replacement command signal output unit 33.

INDUSTRIAL APPLICABILITY

An automatic greasing device for a chuck according to the present invention is suitably used for greasing the chuck in conjunction with tool replacement.

DESCRIPTION OF REFERENCE MARKS IN THE DRAWINGS

1 crankshaft miller
2 workpiece
3 chuck
3a chuck body
3b chuck jaw
7 rotary cutter
25 grease supply device
30 NC device
30a image display (notification means, display means)
30b indicator lamp (notification means, display means)
32 rotary cutter life determination unit
33 rotary cutter replacement command signal output unit
35 greasing command signal output unit
36 notification command signal output unit
37 chuck cleaning command signal output unit

The invention claimed is:

1. An automatic greasing device for a chuck in a crankshaft miller which includes the chuck that comprises a plurality of chuck jaws radially and slidably inserted into a chuck body and which cuts a workpiece clamped by the chuck jaws by means of a rotary cutter, the automatic greasing device comprising:
   a rotary cutter life determination unit which determines whether or not the rotary cutter has reached an end of its life based on at least one of: (i) a counted number of machined workpieces, (ii) a time required for machining the workpieces, and (iii) measured electric current values required for machining the workpieces;
   a rotary cutter replacement command signal output unit which, when it is determined that the rotary cutter has reached the end of its life, outputs a rotary cutter replacement command signal based on a rotary cutter life determination datum output from the rotary cutter life determination unit;
   a greasing command signal output unit which outputs a greasing command signal in response to the rotary cutter replacement command signal acting as a trigger signal output from the rotary cutter replacement command signal output unit;
   a grease supply device which supplies grease to a sliding part inside the chuck in response to the greasing command signal output from the greasing command signal output unit, wherein the sliding part includes a part between the chuck body and each of the chuck jaws;
   a notification command signal output unit which outputs a notification command signal in response to the rotary cutter replacement command signal acting as the trigger signal output from the rotary cutter replacement command signal output unit;
   a notification unit which notifies that the rotary cutter needs replacement in response to the notification command signal output from the notification command signal output unit;
   a chuck cleaning command signal output unit which outputs a chuck cleaning command signal in response to the greasing command signal acting as a trigger signal output from the greasing command signal output unit; and
   a display unit which displays a description urging cleaning of the chuck in response to the chuck cleaning command signal output from the chuck cleaning command signal output unit.

* * * * *